United States Patent
Perry et al.

(10) Patent No.: US 7,333,046 B2
(45) Date of Patent: Feb. 19, 2008

(54) SYSTEM AND METHOD FOR MONITORING TARGETS

(75) Inventors: Richard P. Perry, Amherst, NH (US); Probal K. Sanyal, Syracuse, NY (US); David Matthew Zasada, Taberg, NY (US)

(73) Assignee: The Mitre Corporation, McLean, VA (US)

( * ) Notice: Subject to any disclaimer, the term of this patent is extended or adjusted under 35 U.S.C. 154(b) by 232 days.

(21) Appl. No.: 11/300,381

(22) Filed: Dec. 15, 2005

(65) Prior Publication Data

US 2007/0139250 A1 Jun. 21, 2007

(51) Int. Cl.
*G01S 13/90* (2006.01)

(52) U.S. Cl. .................. 342/25 B; 342/25 F; 342/127; 342/161; 342/162

(58) Field of Classification Search .............. 342/25 R, 342/25 A, 25 B, 25 C, 25 D, 25 E, 25 F, 342/90, 127, 159–162, 176, 195
See application file for complete search history.

(56) References Cited

U.S. PATENT DOCUMENTS

| | | | | |
|---|---|---|---|---|
| 4,034,370 | A | * | 7/1977 | Mims ...................... 342/25 D |
| 4,568,939 | A | * | 2/1986 | Grau ......................... 342/104 |
| 4,885,590 | A | * | 12/1989 | Hasan ....................... 342/196 |
| 5,347,281 | A | * | 9/1994 | Lewis et al. ............... 342/160 |
| 5,559,516 | A | * | 9/1996 | Didomizio et al. ......... 342/118 |
| 5,559,517 | A | * | 9/1996 | Didomizio ................. 342/156 |
| 5,559,518 | A | * | 9/1996 | DiDomizio ................. 342/174 |
| 7,268,723 | B2 | * | 9/2007 | Sanyal ....................... 342/120 |
| 2006/0262008 | A1 | * | 11/2006 | Sanyal ....................... 342/120 |
| 2007/0139250 | A1 | * | 6/2007 | Perry et al. ............... 342/25 B |

FOREIGN PATENT DOCUMENTS

| | | | | |
|---|---|---|---|---|
| JP | 06138219 | A | * | 5/1994 |
| JP | 06138220 | A | * | 5/1994 |

OTHER PUBLICATIONS

Perry, R.P. et al., "SAR Imaging of Moving Targets," *IEEE Transactions on Aerospace and Electronic Systems*, vol. 35, No. 1, pp. 188-200 (Jan. 1999).
Sanyal, P., *The Keystone Process—A Pictorial*, MITRE Technical Report No. MTR 97B0000049, pp. 1-50 (Jan. 1999).
Zasada, D.M., *Tracking Via Keystoning*, MITRE Technology Program, 9 pages of PowerPoint slides (2005).

* cited by examiner

*Primary Examiner*—John B Sotomayor
(74) *Attorney, Agent, or Firm*—Sterne, Kessler, Goldstein & Fox P.L.L.C.

(57) ABSTRACT

A system comprising a moving radar, a processing device, and a phase difference determination device is used to monitor a target. The moving radar has first and second phase centers that transmit and receive signals normal to a direction of movement of the radar. The processing device receives first and second ones of the received signals from the first and second phase centers, respectively, and performs a target motion compensation and target acceleration correction for each of the first and second received signals to produce first and second images. The phase difference determination device determines a phase difference image from a comparison of the first and second images.

26 Claims, 4 Drawing Sheets

SYSTEM AND METHOD FOR MONITORING TARGETS

BACKGROUND

1. Field of the Invention

The present invention relates to monitoring a target. More particularly, the present invention relates to a system and method for monitoring a target using a radar.

2. Background Art

It is desired to be able to continuously and unambiguously perform radar tracking of surface targets and surface moving targets for several minutes to locate, target, and/or engage the moving targets. Conventional radar surface moving target trackers typically drop or confuse tracks after only a short time. This is because targets: stop, start, make quick turns, have low target radial velocity, have terrain screening, etc., which can lead to target detection drop-out. Hence, continuous attention by a human operator is currently required to stitch these short track segments back together.

One computer-based technique used to track targets has been surface motion target indication (SMTI) techniques. However, similar to the problems described above, this technique only produces useful information if a target moves and then stops. This technique cannot be used to track targets that move, stop, change direction, move, stop, etc.

It has been suggested that synthetic aperture radar (SAR) imaging techniques can be used to track moving targets for extended lengths of time and through various movements of the target. However, even when SAR imaging techniques are used, moving targets within SAR images are generally blurred, and thus hard to accurately detect.

Therefore, what is needed is a system and method that would allow for accurate monitoring of a target position regardless of the movement of the target, which also reduces or substantially eliminates a requirement for a human operator to monitor generated images.

SUMMARY

An embodiment of the present invention provides a system comprising a moving radar, a processing device, and a phase difference determination device. The moving radar has first and second phase centers that transmit and receive signals normal to a direction of movement of the radar to monitor a target. The processing device receives first and second ones of the received signals from the first and second phase centers, respectively, and performs a target motion compensation and target acceleration correction for each of the first and second received signals to produce first and second images. The phase difference determination device determines a phase difference image from a comparison of the first and second images.

Another embodiment of the present invention provides a method. Signals from first and second phase centers of a moving radar are transmitted in a direction normal to a direction of movement of the radar. First and second return signals are received at the phase centers of the moving radar. Target motion compensation is performed for each of the first and second return signals. Target acceleration correction is performed for each of the first and second return signals. First and second images are generated based on the target motion compensation and target acceleration correction of respective ones of the first and second return signals. A phase difference image is generated from a comparison of the first and second images.

In one example, an anomaly within the phase difference image represents a moving target. In one example, a phase of the anomaly represents an actual location of the moving target within the phase difference image.

Further embodiments and features of the present inventions, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate one or more embodiments of the present invention and, together with the description, further serve to explain the principles of the invention and to enable a person skilled in the pertinent art to make and use the invention.

Figure 1:
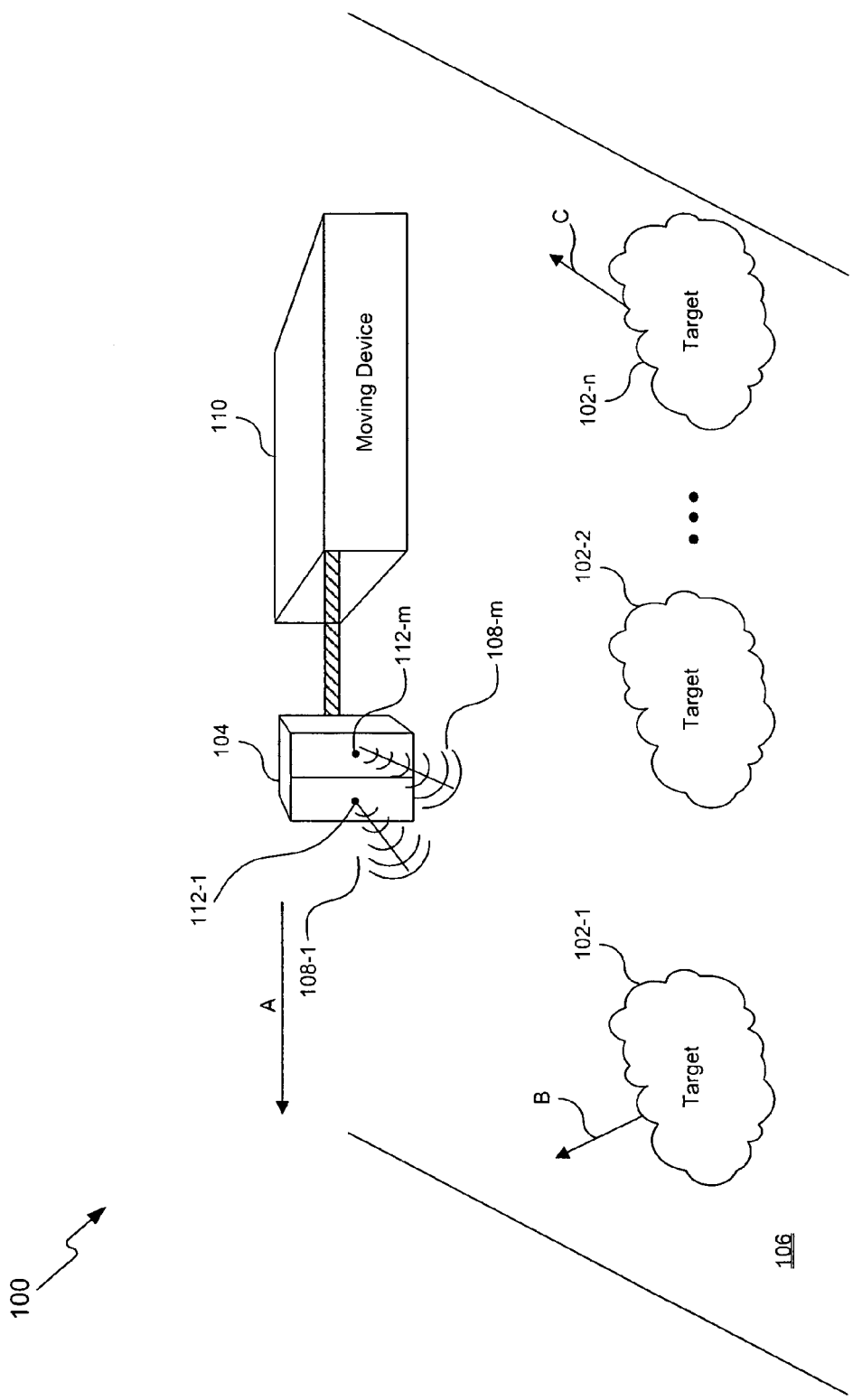
FIG. 1 shows a schematic diagram of a system for monitoring targets with a moving radar, according to one embodiment of the present invention.

The present invention will now be described with reference to the accompanying drawings. In the drawings, like reference numbers may indicate identical or functionally similar elements. Additionally, the left-most digit(s) of a reference number may identify the drawing in which the reference number first appears.

DETAILED DESCRIPTION

Overview

While specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications.

Overall System

FIG. 1 shows a schematic diagram of a system 100 for monitoring targets 102-1 to 102-$n$ ($n>0$) using a radar 104 moving in the direction of arrow A, according to one embodiment of the present invention. For ease of explanation, appendices "-n" may not be included in all of the descriptions below. Targets 102 can be stationary on a surface 106, e.g., target 102-2, or moving in various directions on surface 106, e.g., targets 102-1 and 102-$n$ moving in respective directions of arrows B and C. Radar 104 transmits and receives signals 108-1 to 108-$m$ ($m>0$), while moving based on being coupled to a moving device 110. In various examples, moving device 110 can be an airborne vehicle (e.g., an airplane, a drone, etc.), a space-based vehicle (e.g., a satellite, a rocket, a shuttle, etc.), or similar device. Radar 104 is oriented, through its coupling with respect to moving device 110, so that it performs as a moving side transmitting radar. For example, a moving side transmitting radar will transmit and receive signals normal to its direction of movement. In one example, radar 104 is a synthetic aperture radar (SAR) that produces SAR images of surface 106 and targets 102.

In one example, radar 104 includes respective first and second phase centers 112-1 and 112-2, through which corresponding signals 108-1 and 108-2 are transmitted and received. In other examples, radar 104 can include any number of phase centers 112-$m$ (m>0), as would be appropriate for a particular application, and as would be apparent to a skilled artisan.

Figure 2:
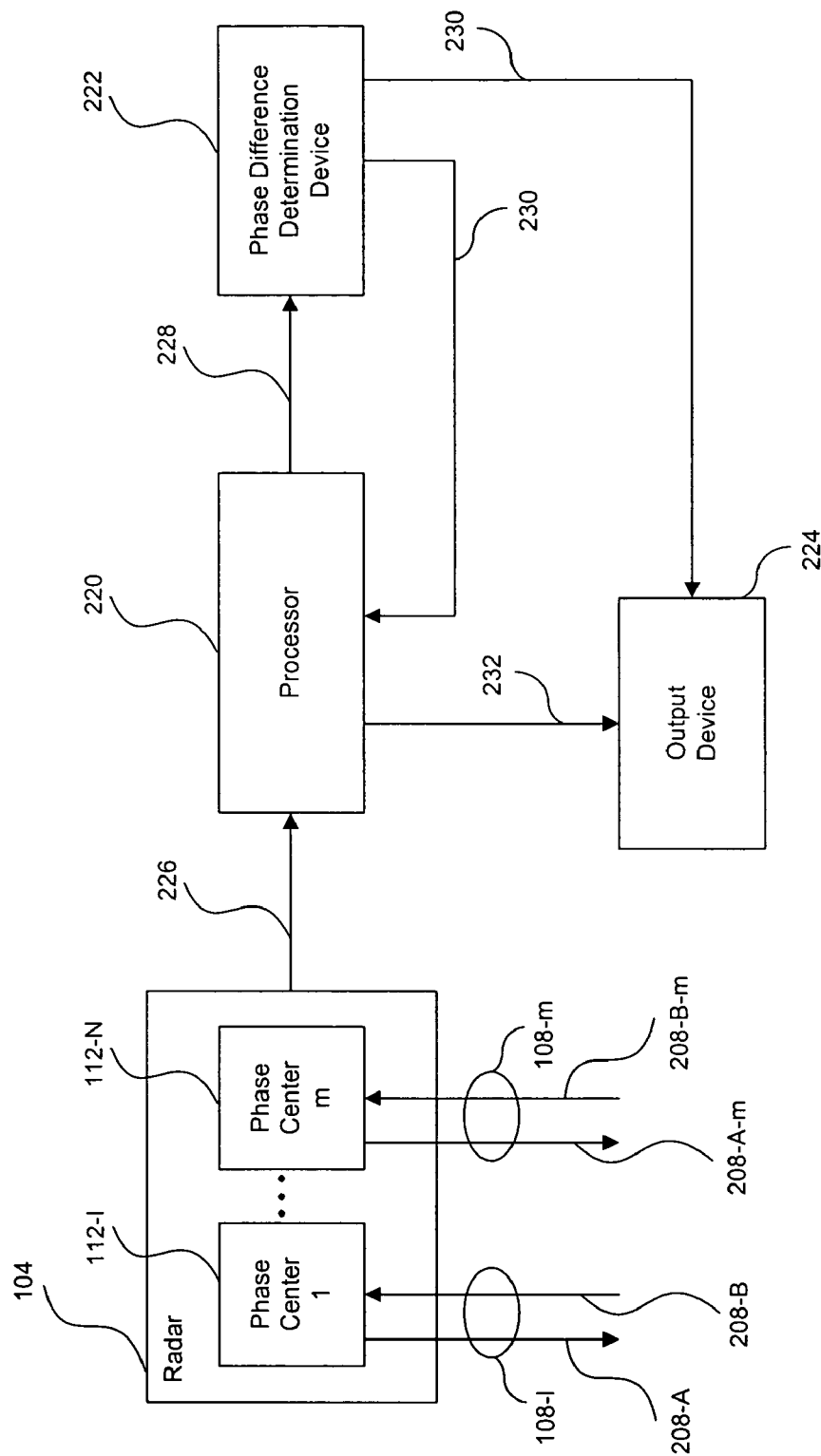
FIG. 2 shows a block diagram of a portion of the system in FIG. 1, according to one embodiment of the present invention.

FIG. 2 shows a block diagram of a portion of system 100, according to one embodiment of the present invention. The portion of system 100 shown in FIG. 2 includes radar 104, a processor 220, a phase difference determination device 222, and an output device 224. In one example, processor 220, phase difference determination device 222, and/or output device 224 can be located in/on moving device 110, while in another example processor 220, phase difference determination device 222, and/or output device 224 can be located remotely from moving device 110. When located remotely, processor 220, phase difference determination device 222, and/or output device 224 can receive data either from moving device 110 or radar 104 via a wired or wireless communications systems, as would be apparent to a skilled artisan.

In the example shown, phase centers 112 of radar 104 transmit and receive signals 108, where each signal 108 includes a transmitted signal 208-A and a received (return) signal 208-B. Received signal 208-B includes information regarding surface 106 and one or more targets 102 on surface 106. Processor 220 receives a signal/image 226, where the terms signal and image are used interchangeably throughout this description. Signal 226 can be comprised of a plurality of portions, where each portion of signal 226 relates to respective received signals 208-B for each respective phase center 112 of radar 104. In one example, image 226 can be a SAR image. In the examples discussed below, the signal 226 can include first and second signals/images, e.g., first and second SAR images.

In one example, processor 220 can be a microprocessor, a digital signal processor, or the like, which processes signal 226, and possibly other signals, while under control of underlying firmware, software, or both. In another example, processor 220 can be part of a computer system, as would be apparent to a skilled artisan. Alternatively or additionally, additional hardware components can be used to perform one or more of the operations discussed below.

In one example, after processor 220 receives signal 226, each component part of signal 226 (i.e., each portion related to a phase center) is separately processed. For example, processing can include performing target motion compensations and target acceleration corrections, which are described in more detail below. In one example, target motion compensation is performed before target acceleration correction, while in another example they are performed in the opposite order.

After processing signal 226, a processed image/signal 228 is transmitted to phase difference determination device 222. Again, as discussed above, signal 228 can include information representing each component of signal 226 (i.e., representing each received signal 208-B at each phase center 112). In the example being discussed, the first and second processed images are produced or generated by processor 220 and represented in signal 228.

Phase difference determination device 222 is used to generate a phase difference image 230. In one example, phase difference determination device 222 can be an interferometer, such as a phase interferometer. In essence, phase difference determination device 222 subtracts phases within a second processed image relating to a second received signal 208-B-2 received at second phase center 112-2 from phases within a first processed image relating to first received signal 208-B-1 received at first phase center 112-1 during a same time period. First and second processed images can contain different phase information because of the offset in position along radar 104 of phase centers 112-1 and 112-2. Thus, phase difference image 230 formed by subtracting a phase of a second image from a phase of a first image shows differences in phase of the images at different portions of the images.

In one example, phase difference image 230 is transmitted to output device 224, e.g., a display, for visual output. In one example, this can be illustrated through different colors within a displayed image, where each color represents a phase value (as discussed with respect to FIG. 3). In other examples, other techniques can be used to display the relative phases, as would be known to a skilled artisan.

In another example, phase difference image 230 is transmitted, either additionally or alternatively, to processor 220 for further processing. In one example, after further processing is performed by processor 220, a processed image 232 can be transmitted to output device 224.

In one example, the further processing can comprise determining if an anomaly exists within the phase difference image 230. For example, an anomaly can be an "out-of-place" phase. What is meant by out-of-place is, for example, when a phase difference of 20 degrees is located in an area of the phase difference image 230 representing a phase difference of 80 degrees. In the color technique described above, this can mean, for example, a yellow streak (e.g., an anomaly) shows up in a blue area of the phase difference image 230. In one example, the anomaly within the phase difference image 230 can represent that one of targets 102 that was moving with respect to surface 106 during the image capture. After determining the anomaly exists, in one example processor 220 can then determine an actual position of the anomaly within phase difference image 230 (e.g., a location of the moving target 102 on surface 106) by matching of the phase difference value of the anomaly to locations of substantially similar phase difference values within the phase difference image 230, as is discussed in more detail below with reference to FIG. 3.

Exemplary Target Motion Compensation Processing Technique

In one example, a processing technique performed by processor 220 on signal 226 is target motion compensation. This is sometimes referred to as range walk compensation. The range walk is a shifting in position of target 102 along surface 106 during the image capture. This movement can cause integration loss and smearing of the target data. Thus, target motion compensation is performed to compensate for blurring within an image caused by the movement of a target 102 during the time radar 104 is capturing the image.

In one example, target motion compensation can be accomplished within processor 220 using Keystone formatting techniques developed by MITRE of McLean, Va. For an exemplary description of the Keystone technique, see Perry et al. "SAR Imaging of Moving Targets," *IEEE TRANSACTIONS ON AEROSPACE AND ELECTRONIC SYSTEMS*, Vol. 35, No. 1, 1999, pages 188-200, which is incorporated by reference herein in its entirety. Keystone formatting can allow for compensation for several targets 102 moving at different radial velocities simultaneously. Keystone formatting can be derived by noting that the spectrum of a single received pulse 208-B is given by, $$S_r(f) = P(f)\exp\left[-i\frac{4\pi}{c}(f+f_0)R(t)\right] \quad (1)$$

where
P(f)=spectrum of transmitted pulse 208-A $$f = \text{baseband frequency } B \text{ where}\left(\frac{-B}{2} \le f < \frac{B}{2}\right),$$

$f_0$=carrier frequency.
$S_r(f)$ is the keystone technique function,
i is an imaginary component,
R is range between radar and target at time t,
c is a speed of positive light,
$\dot{R}$ is the first derivative of the range with respect t time and
t' is a value of time.
Expanding R(t) in a Taylor series, results in:

$$R(t) = R(t_0) + \dot{R}(t_0)t + \frac{1}{2}\ddot{R}(t_0)t^2 + \cdots . \quad (2)$$

Substituting (2) into (1) and dropping cubic and higher order terms, $$S_r(f) = P(f)\exp\left[-i\frac{4\pi}{c}(f+f_0)R - i\frac{4\pi}{c}(f+f_0)\dot{R}t - i\frac{2\pi}{c}(f+f_0)\ddot{R}t^2\right]. \quad (3)$$

The second term in the brackets containing the product f $\dot{R}$t gives rise to range walk. This term becomes zero when the temporal transformation is used:

$$t = \left(\frac{f_0}{f+f_0}\right)t'.$$

With the above substitution, (3) can be written as, $$S_r(f) = \quad (4)$$
$$P(f)\exp\left[-i\frac{4\pi}{c}(f+f_0)R - i\frac{4\pi}{c}f_0\dot{R}t' - i\frac{2\pi}{c}(f+f_0)\ddot{R}\left(\frac{f_0t'}{f+f_0}\right)^2\right].$$

Since the Keystone formatting does not solve the quadratic (or higher order) motion problem, the quadratic term in (4) is dropped, and simplified as:

$$S_r(f) = P(f) * \exp\left[-i\frac{4\pi}{c}(f+f_0)R - i\frac{4\pi}{c}f_0\dot{R}t'\right]. \quad (5)$$

Notice that the substitution of t' for t has removed the phase term that varied with both time and frequency, and this removes the range-walk. Thus, no matter what the velocity of each target 102, each target 102 will remain in a given range determined by its position at the center (t=0) of the coherent processing interval.

Exemplary Target Acceleration Correction Processing Techniques

In one example, another processing technique performed by processor 220 on signal 226 is target acceleration correction. While the Keystoning technique corrects for the range walk due to the velocity, by itself it cannot correct for the image defocusing that results from acceleration of moving target 102, which can introduce quadratic phase error (QPE) in image 226. In one example, a pre-computation can be performed in conjunction with processor 220 for the acceleration to determine an appropriate correction that can be applied to image 226. Without the appropriate acceleration correction, image 226 can be practically unrecognizable. With the optimum acceleration correction, image 226 can be clearly recognizable, for example as an area with several buildings, roads, a ball park, etc.

In one example, to find the optimum acceleration correction, processor 220 performs a pre-selected trial using a few values around an expected acceleration value of target 102, e.g., with a starting point of 1.97 m/s$^2$, until the image intensity has peaked. For example, in one case this value was found to be 2.225 m/s$^2$.

Exemplary Phase Difference Image with Anomaly

Figure 3:
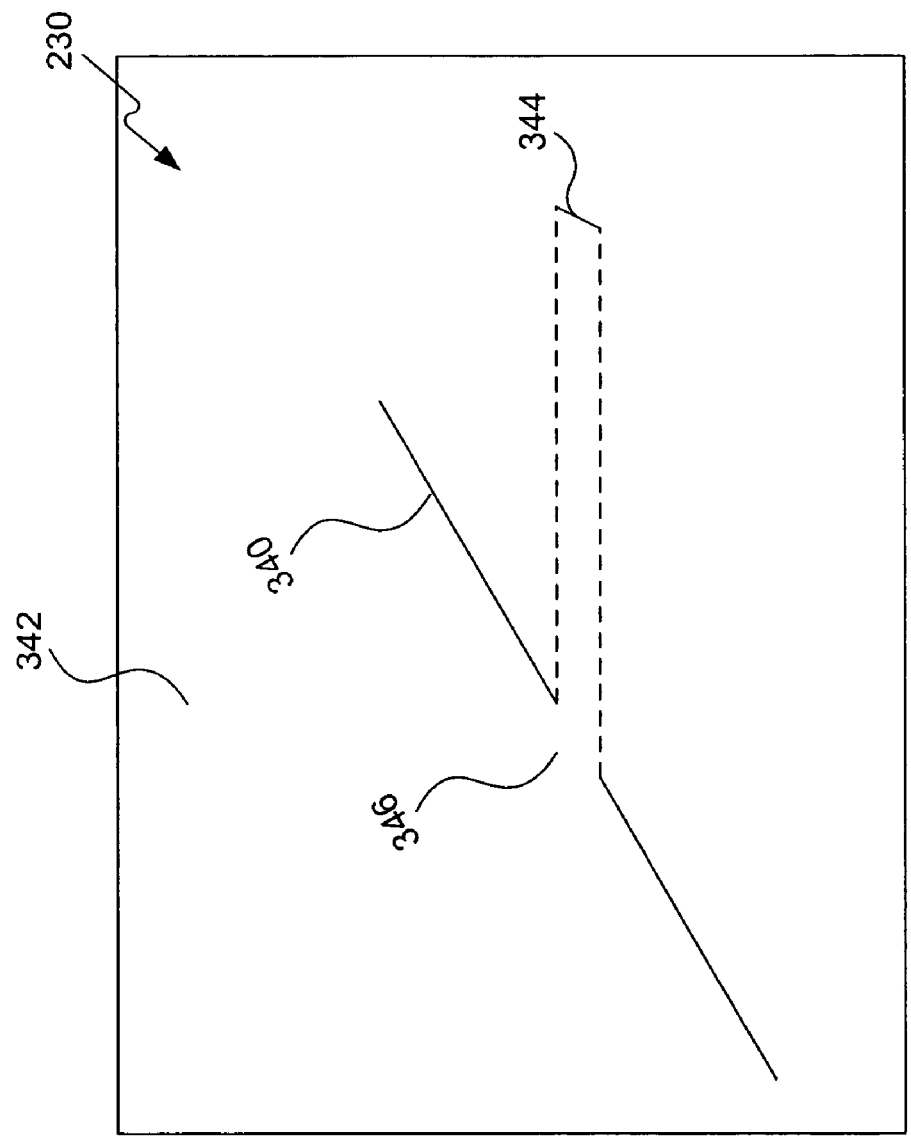
FIG. 3 shows a phase difference image, according to one embodiment of the present invention.

FIG. 3 shows phase difference image 230, according to one embodiment of the present invention. For ease of explanation, only two "colors" are shown in phase difference image 230. The two colors are black 340 and white 342. Each color represents a particular phase difference value determined by comparing first and second processed signals in phase difference determination device 222. The black color 340 or white color 342 is within phase difference image 230 represents a relative location within surface 106.

As is seen, an "out-of-place" portion 344, e.g., an anomaly, appears in phase difference image 230. This portion 344 appears out of place, and thus is classified as an anomaly, because: (1) there is missing information at location 346 of black color 340 and (2) all other portions of image 230 having black color 340 (e.g., having substantially similar phase differences) like portion 344 are within a similar area of phase difference image 230 or follow a pattern within phase difference image 230. Thus, portion 344 is classified as an anomaly. Anomaly 344 represents an indication that one of the objects 102 is moving along surface 106 because movement of an object 102 along surface 106 during taking of an image by radar 104 has been determined to cause such anomalies.

In one example, processor 220 is used to determine an actual position within phase difference image 230 of anomaly 344. This can be done through determining a phase difference value of anomaly 344 using processor 220. Then, processor 220 determines where in image 230 substantially similar phase difference values are located. By determining where anomaly 344 should be within phase difference image 230, processor 220 can determine where on surface 106 there is a moving target 102.

It is to be appreciated that any number of moving targets 102 can be captured using radar 104, and that a corresponding number of anomalies can be detected within a phase difference image 230. This can be true regardless of varying of directions, movements, and velocities of movement of the targets 102. Thus, multiple moving targets 102 can be continuously and accurately tracked/monitored using system 100.

Thus, through motion and acceleration processing of two image signals 226 in processor 220 and generation of phase difference image 230 from two processed images 228 using phase difference determination device 222, a phase difference image 230 can be generated. Phase difference image 230 can be used to make: (1) a determination that at least one target 102 is moving along surface 106 and (2) a determination of an actual location with respect to surface 106 of the moving target 102.

Exemplary Operation

Figure 4:
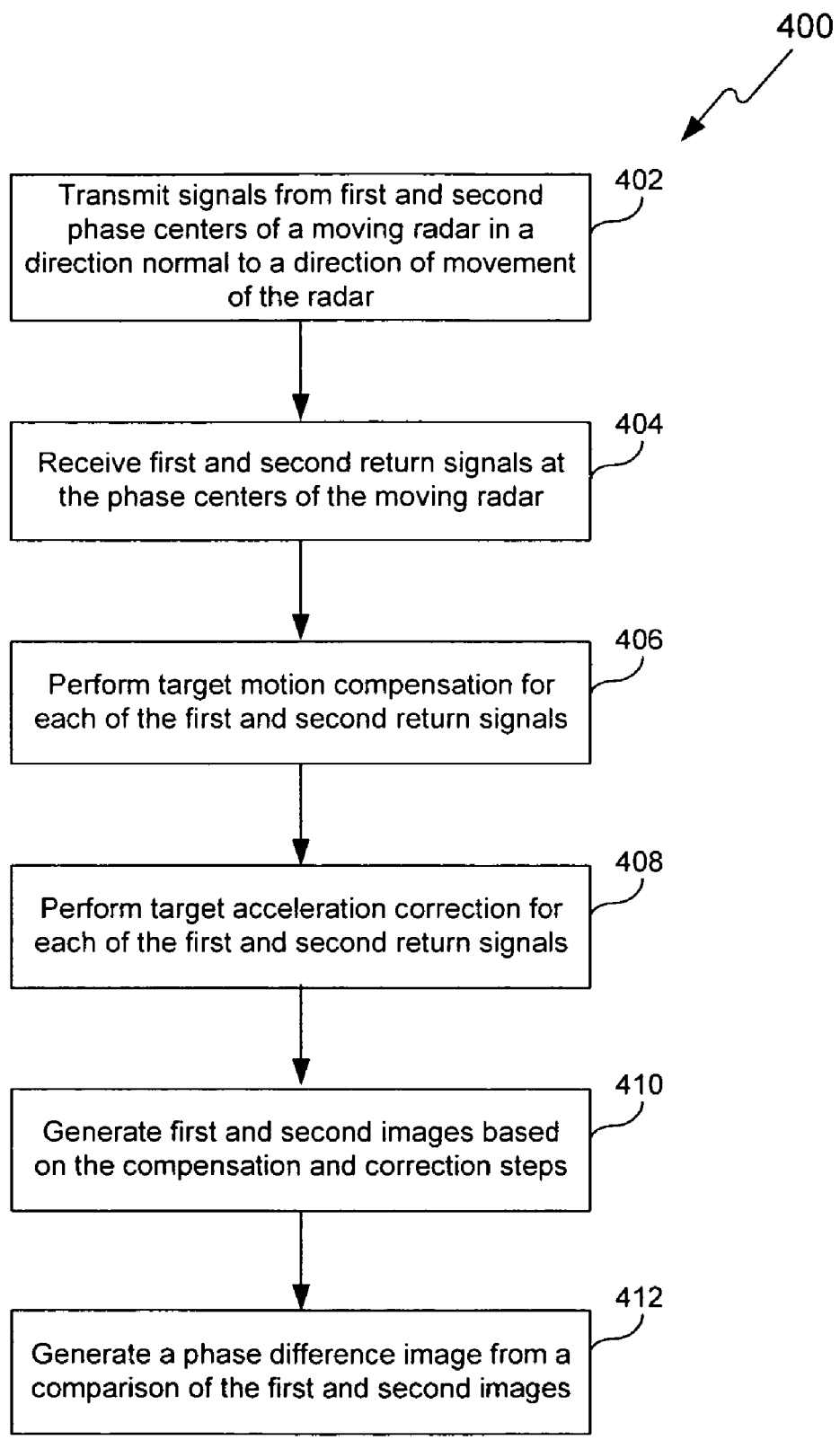
FIG. 4 shows a flowchart depicting a method, according to one embodiment of the present invention.

FIG. 4 shows a flowchart depicting a method 400, according to one embodiment of the present invention. In one example, method 400 can be performed using one or more portions of system 100 discussed above.

In step 402, signals from first and second phase centers of a moving radar are transmitted in a direction normal to a direction of movement of the radar. In step 404, first and second return signals are received at the phase centers of the moving radar. In step 406, target motion compensation is performed for each of the first and second return signals. In step 408, target acceleration correction is performed for each of the first and second return signals. In step 410, first and second images are generated based on the target motion compensation and target acceleration correction of the respective first and second return signals. In step 412, a phase difference image is generated from a comparison of the first and second images.

In one example, method 400 can also determine if the target is moving if an anomaly is detected in the phase difference image. When this is performed, method 400 can also determine a position of the target by matching a phase of the anomaly with substantially similar phases within the phase difference image.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

It is to be appreciated that the Detailed Description section, and not the Summary and Abstract sections, is intended to be used to interpret the claims. The Summary and Abstract sections may set forth one or more, but not all exemplary embodiments of the present invention as contemplated by the inventor(s), and thus, are not intended to limit the present invention and the appended claims in any way.

What is claimed is:

1. A system, comprising:
a moving radar with first and second phase centers that receive a common transmitted signal normal to a direction of movement of the radar to monitor targets;
a processing device that receives first and second ones of the received signals from the first and second phase centers, respectively, and performs a target motion compensation and target acceleration correction for each of the first and second received signals to produce first and second images; and
a phase difference determination device that determines a phase difference image from a comparison of the first and second images.

2. The system of claim 1, wherein the processor detects when the target is moving when an anomaly is detected in the phase difference image.

3. The system of claim 2, wherein the processor detects a position of the target by matching a phase of the anomaly with substantially similar phases within the phase difference image.

4. The system of claim 1, wherein the radar generates a synthetic aperture radar (SAR) image for each phase center.

5. The system of claim 1, wherein processing device performs the target motion compensation using a keystoning technique.

6. The system of claim 5, wherein the processing device performs the keystoning technique using the following formula:

$$S_r(f) = P(f) * \exp\left[-i\frac{4\pi}{c}(f+f_0)R - i\frac{4\pi}{c}f_0 \dot{R} t'\right],$$

wherein
$S_r(f)$ is the keystone technique function,
$P(f)$ is a spectrum of transmitted pulse,
f is a baseband frequency,
$f_0$ is a carrier frequency,
i is an imaginary component,
R is range between radar and target at time t,
c is a speed of positive light,
$\dot{R}$ is the first derivative of the range with respect t time and
t' is a value of time.

7. The system of claim 1, wherein there are a plurality of the phase centers of the radar, and the first and second phase centers are chosen by one of the radar or the processing device from the plurality of phase centers for each time period.

8. The system of claim 1, wherein the phase difference determination device comprises an interferometer.

9. The system of claim 1, wherein the processor performs target motion compensation as a range walk removal.

10. The system of claim 1, further comprising:
a plurality of targets, wherein the first and second images include information associated with each of the plurality of targets.

11. The system of claim 10, wherein each of the plurality of targets is moving at least one of at a different velocity and in a different direction.

12. The system of claim 1, wherein the processor performs the target acceleration correction using an iterative technique.

13. A method, comprising:
(a) transmitting signals from first and second phase centers of a moving radar in a direction normal to a direction of movement of the radar;
(b) receiving first and second return signals at the phase centers of the moving radar;
(c) performing target motion compensation for each of the first and second return signals;
(d) performing target acceleration correction for each of the first and second return signals;
(e) generating first and second images based on steps (c) and (d); and
(f) generating a phase difference image from a comparison of the first and second images.

14. The method of claim 13, further comprising:
(g) determining if the target is moving if an anomaly is detected in the phase difference image.

15. The method of claim 14, further comprising:
(h) determining a position of the target by matching a phase of the anomaly with substantially similar phases within the phase difference image.

16. The method of claim 13, wherein the radar generates a synthetic aperture radar (SAR) image for each phase center.

17. The method of claim 13, wherein step (c) comprises using a keystoning technique.

18. The method of claim 17, wherein the keystoning technique uses the following formula:

$$S_r(f) = P(f) * \exp\left[-i\frac{4\pi}{c}(f+f_0)R - i\frac{4\pi}{c}f_0\dot{R}t'\right],$$

wherein
  $S_r(f)$ is the keystone technique function,
  $P(f)$ is a spectrum of transmitted pulse,
  f is a baseband frequency,
  $f_0$ is a carrier frequency,
  i is an imaginary component,
  R is range between radar and target at time t,
  c is a speed of positive light,
  $\dot{R}$ is the first derivative of the range with respect t time and
  t' is a value of time.

19. The method of claim 13, wherein there are a plurality of the phase centers of the radar, and the first and second phase centers are chosen from the plurality of phase centers for each time period.

20. The method of claim 13, wherein step (f) is performed using interferometry.

21. The method of claim 13, wherein step (c) comprises a range walk removal.

22. The method of claim 13, wherein the first and second images include information associated with each of a plurality of targets.

23. The method of claim 22, wherein each of the plurality of targets is moving at least one of at a different velocity and in a different direction.

24. The method of claim 13, wherein step (d) comprises using an iterative technique.

25. The method of claim 13, wherein step (c) is performed before step (d).

26. The method of claim 13, wherein step (d) is performed before step (c).

* * * * *